G. H. BLISS.
COVER FASTENER.
APPLICATION FILED JUNE 19, 1919.
1,344,576.
Patented June 22, 1920.
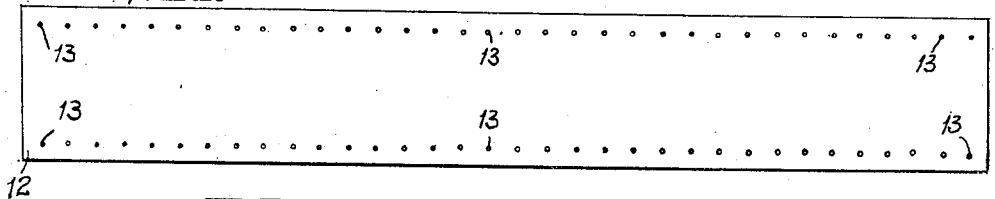
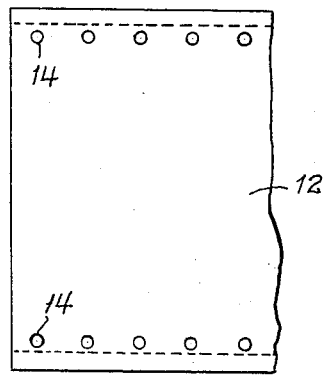
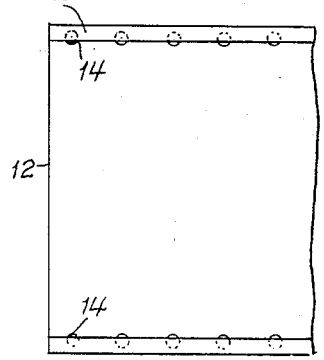
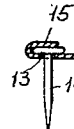
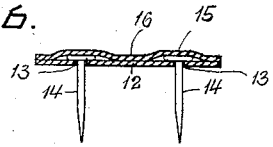
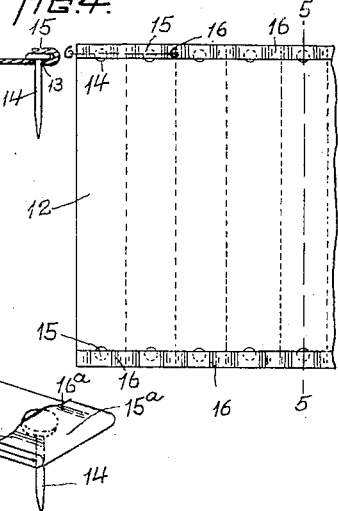
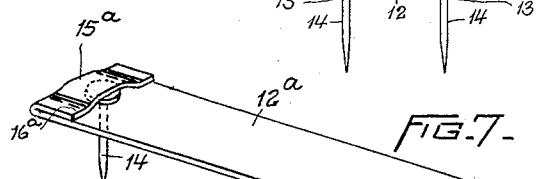
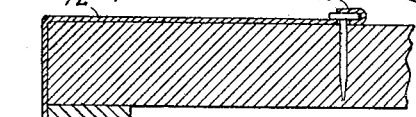
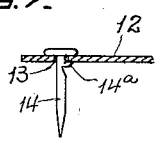
INVENTOR:
George H. Bliss
ATTYS.

UNITED STATES PATENT OFFICE.

GEORGE H. BLISS, OF BOSTON, MASSACHUSETTS, ASSIGNOR TO A. G. BRADISH & SON, INC., OF BOSTON, MASSACHUSETTS, A CORPORATION OF MASSACHUSETTS.

COVER-FASTENER.

1,344,576.      Specification of Letters Patent.      Patented June 22, 1920.

Application filed June 19, 1919. Serial No. 305,210.

*To all whom it may concern:*

Be it known that I, GEORGE H. BLISS, a citizen of the United States, residing at Boston, in the county of Suffolk and State of Massachusetts, have invented new and useful Improvements in Cover-Fasteners, of which the following is a specification.

This invention relates to a fastener for the cover of a tub or other receptacle, the fastener comprising an oblong strip of flexible sheet metal and headed nails or tacks secured to the strip near its opposite ends by flanges formed by bending the end portions of the strip, said flanges bearing against the outer sides of the nail heads and holding said heads against one side of the strip. The fastener is applied by driving one of the nails into one of the two parts to be connected, said parts being the body and cover of a receptacle, bending the strip over the receptacle, and driving the other nail into the other part.

One object of the invention is to provide a fastener, the nail-confining flanges of which are guarded by the body of the fastener, the corners of said flanges lying closely against the said body, so that they are not liable to injure the hands of persons handling the receptacle, and are not liable to be otherwise objectionable.

Another object of the invention is to provide a gang or group of incomplete fasteners, including a sheet metal blank of indeterminate length, and adapted to be converted into a plurality of operative fasteners, by the simple operation of cutting said blank crosswise into a plurality of strips, each having a nail at its opposite ends.

To these ends the invention consists in the improvements which I will now proceed to describe and claim.

Of the accompanying drawings forming a part of this specification,—

Figure 1 is a plan view of a partially completed sheet metal blank from which a plurality of fastener bodies may be made.

Fig. 2 is a plan view, on a larger scale, of a portion of said blank provided with nails.

Fig. 3 is a view similar to Fig. 2, showing the blank folded to provide the nail-confining flanges.

Fig. 4 is a view similar to Fig. 3, showing the flanges bent inwardly between adjacent nails.

Fig. 5 is an enlarged section on line 5—5 of Fig. 4.

Fig. 6 is an enlarged section on line 6—6 of Fig. 4.

Fig. 7 is a perspective view of a completed fastener embodying the invention.

Fig. 8 is a sectional view showing the fastener applied to a tub and its cover.

Fig. 9 is a fragmentary sectional view showing a modification.

The same reference characters indicate the same parts in all of the figures.

In carrying out my invention, I cut from any suitable flexible sheet metal, preferably tinned sheet iron, an oblong rectangular blank 12 (Fig. 1), which may be of any desired length, the width of the blank being such that strips formed by cutting the blank crosswise will be of sufficient length to form the body and nail-confining flanges of the fastener shown by Figs. 7 and 8.

In the blank I form rows of nail holes 13, extending parallel with and spaced from the longitudinal edges of the blank.

Headed nails or tacks 14 are next inserted in the holes 13, said holes being uniformly spaced apart and of sufficient size to permit the nails to drop freely from a loading device holding a gang of nails, so that each row of holes may be simultaneously supplied with nails. The blank is next folded along the dotted lines shown by Fig. 2, to form nail-confining flanges 15, bearing on the outer sides of the nail heads and holding their inner sides against one side of the blank. The folding operation may be quickly performed by a suitable flange-forming appliance. I prefer to indent the flanges 15 between adjacent nails by pressing portions 16 of said flanges against the body of the blank, as shown by Figs. 4 and 6.

The blank provided with nails and nail-confining flanges, as described, is convertible into a plurality of operative fasteners, by cutting the blank crosswise along the dotted lines shown by Fig. 4, said lines extending between adjacent nails and through the flanges 15.

A fastener manufactured as above described includes a body portion 12$^a$ having integral flanges 15$^a$, the end portions 16$^a$ of which are pressed inwardly at opposite sides of the nail heads, so that the flanges are stiffened to resist force tending to bend them outward from the body, and the flange corners bear on the body portion and are guarded by the latter. In other words, the flange corners are not so separated from the body portion that they are liable to injure hands grasping a receptacle or package equipped with the described fasteners. Moreover, the flange corners, thus guarded, are not liable to engage anything which would be liable to bend the flanges outwardly if they were not guarded.

I am enabled by first making a blank as above described to manufacture fasteners of the type to which my invention relates much more rapidly and cheaply than heretofore, and effect a marked saving of time and expense in the operations of inserting the nails and forming the flanges. The blank when provided with nails and flange strips, can be cut crosswise at no greater expense than a blank without nails and flanges.

It is obvious that the blank may be cut crosswise into strips, each having more than one nail at each end. For example, the blank may be cut crosswise to form strips of double the width indicated by the dotted lines in Fig. 4, each strip having two nails at each end. It will be understood, therefore, that reference in the following claims to fasteners each having a nail and a nail-confining flange at each end, is not intended as a limitation to one nail at each end.

The nails may be secured to prevent their removal from the blank 12, by forming on each nail an enlargement bearing on the inner side of the blank. Said enlargement may be formed by displacing a portion of the metal of the nail shank to form a bur or shoulder 14ª, as indicated by Fig. 9. The nails of each row may be simultaneously enlarged by mechanism provided for that purpose.

I claim:

1. A cover fastener comprising an oblong rectangular strip of sheet metal, having holes near its opposite ends, nails inserted in said holes and having heads bearing on one side of the strip, and nail-confining flanges integral with the strip and bearing on the outer sides of the nail heads, the end portions of said flanges being pressed inwardly at opposite sides of the nail heads, against the body of the strip, so that the flanges are stiffened to resist force tending to bend them outward from the body, and the flange corners are seated directly on the body and are guarded by the latter.

2. A gang or group of incomplete cover fasteners comprising a rectangular blank of sheet metal of indeterminate length having rows of holes spaced from and parallel with its longitudinal edges, headed nails inserted in said holes, the nail heads bearing on one side of the blank, and elongated nail-confining flanges integral with the blank and bearing on the outer sides of the nail heads, the nails being arranged to permit the blank to be cut crosswise, between adjacent nails, into a plurality of fasteners each having a nail and a nail-confining flange at each end.

3. A gang or group of incomplete cover fasteners comprising a rectangular blank of sheet metal of indeterminate length having rows of holes spaced from and parallel with its longitudinal edges, headed nails inserted in said holes, the nail heads bearing on one side of the blank, and elongated nail-confining flanges integral with the blank and bearing on the outer sides of the nail heads, the nails being arranged to permit the blank to be cut crosswise, between adjacent nails, into a plurality of fasteners each having a nail and a nail-confining flange at each end, said flanges being pressed inwardly between the nails into contact with the body of the blank, to stiffen the flanges on the subsequently formed fasteners and cause the corners of the flanges to bear directly on the bodies of said fasteners.

4. A gang or group of incomplete cover fasteners comprising an elongated blank of sheet metal having rows of nail holes spaced from and parallel with its longitudinal edges, and headed nails inserted in said holes, the nail heads bearing on one side of the blank, means being provided for preventing the removal of the nails from the blank, the nails being arranged to permit the blank to be cut crosswise, between adjacent nails, into a plurality of fasteners, each having a nail at each end.

In testimony whereof I have affixed my signature.

GEORGE H. BLISS.